United States Patent

Goodin et al.

[11] Patent Number: 6,120,821
[45] Date of Patent: Sep. 19, 2000

[54] METHOD FOR PREPARING COLOR CHANGING FOOD

[75] Inventors: Martha Goodin, Battle Creek, Mich.; Gordon C. Kivi, Madison Lake, Minn.; Carol L. Locey, Portage, Mich.

[73] Assignee: Kalsec, Incorporated, Kalamazoo, Mich.

[21] Appl. No.: 09/184,470

[22] Filed: Nov. 2, 1998

[51] Int. Cl.$^7$ ..................................................... A23L 1/275
[52] U.S. Cl. ............................ 426/268; 426/89; 426/98; 426/250
[58] Field of Search .................................. 426/89, 98, 99, 426/250, 262, 268, 289, 540, 549

[56] References Cited

U.S. PATENT DOCUMENTS

| | | | |
|---|---|---|---|
| 3,084,050 | 4/1963 | Holland et al. | 99/141 |
| 3,592,940 | 7/1971 | Quesada | 99/148 |
| 4,780,326 | 10/1988 | Stemmler et al. | 426/125 |
| 5,002,789 | 3/1991 | Graf et al. | 426/540 |
| 5,069,918 | 12/1991 | Graf et al. | 426/243 |
| 5,073,392 | 12/1991 | Atwell et al. | 426/231 |
| 5,230,913 | 7/1993 | Klemann | 426/97 |
| 5,230,918 | 7/1993 | Anderson et al. | 426/572 |
| 5,362,504 | 11/1994 | Kamper et al. | 426/89 |
| 5,393,333 | 2/1995 | Trouve | 106/149 |
| 5,458,898 | 10/1995 | Kamper et al. | 426/243 |

*Primary Examiner*—Keith D. Hendricks
*Attorney, Agent, or Firm*—Flynn, Thiel, Boutell & Tanis, P.C.

[57] ABSTRACT

A food composition having the ability to change color when heated to a temperature above 160°, comprising (1) an edible substrate and (2) a color system of colored edible particles coated by a composition consisting essentially of (a) a distilled glyceride selected from the group consisting of distilled monoglycerides, distilled diglycerides and mixtures thereof and (b) titanium dioxide. In a preferred form, the coating also contains carbomethoxy cellulose.

20 Claims, No Drawings

METHOD FOR PREPARING COLOR CHANGING FOOD

BACKGROUND OF THE INVENTION

1. Field of Invention

This invention relates to a food composition having the ability to change its color when heated.

2. Brief Statement of Prior Art

The color of food contributes to its appetizing appearance, so much work has been done on compositions and methods for improving food color. One area of particular interest has been that of producing food products that change color upon heating. As a result, the use of principles of food science, chemistry and physics have been used in systems to effectuate the change in color of food upon exposure of the food to microwave energy or heat by conventional cooking methods. Prior art methods and compositions include:

U.S. Pat. Nos. 5,362,504 and 5,458,898 disclose an edible microwave susceptor composition and a process for applying the composition to a prepared food substrate. The composition comprises by weight 8% to 97% of an edible fatty triglycerides, 2% to 90% of a microwave absorbing polyhydric alcohol, 1% to 90% of a microwave emulsifier. The preferred emulsifier is polyglycerol esters and 10% to 30% of a microwave absorbing inorganic material. The list of these materials include titanium dioxide.

These patents also disclose that colored compositions disguised by microencapsulation, which encapsulate melts upon heating to expose the color, are known in the art (column 3, lines 38–46). However, this disclosure does not describe the composition of the encapsulate. Furthermore, it indicates that such coatings have "met with only limited commercial success". The composition requires at least 8% fat (triglycerides), as well as the presence of a polyhydric alcohol. While the use of titanium dioxide is referred to, the preferred edible inorganic material is selected from the group consisting of trisodium phosphate, sodium potassium tartrate and mixtures thereof (see the paragraph bridging columns 6 and 7). Furthermore, titanium dioxide is not part of any of the compositions exemplified.

U.S. Pat. Nos. 5,002,789 and 5,069,918 disclose a food colorant system and use of the system to color foods upon heating. The color system comprises a diluent and colorant in particle form. The color of a food is controlled by controlling the size and dilution rate of the colorant. This patent claims the color system.

The coloring system utilizes small colored particles, preferably less than 100 microns, and most preferably between 3–40 microns.

U.S. Pat. No. 5,073,392 discloses a method of forming a microwaveable food product having a preselected color. The system employs the use of Maillard reactants and programmed computer means. Maillard reactants include reducing sugars and amine sources.

The use of monoglycerides, diglycerides, titanium dioxide in food products is known in the art.

U.S. Pat. No. 3,084,050 discloses a powdered dusting composition for bakery products that includes starch, fat and titanium. The titanium is included to improve adherence of the coating, as well as to give it an attractive white appearance.

U.S. Pat. No. 3,592,940 discloses a whitening composition that comprises (1) a fatty material other than partial esters of polyols and fatty acids which have limited solubility in alcohol, (2) at least one partial ester of a polyol and (3) finely divided titanium dioxide.

U.S. Pat. No. 4,780,326 discloses a hot melt composition for the coating of meat comprising acetylated monoglycerides, paraffin and/or microcrystalline wax, cellulose ester and pigment selected from a group that include titanium dioxide.

U.S. Pat. No. 5,230,913 discloses a food product comprising particulate fat insoluble inorganic material (which can be titanium dioxide) coated with an edible fat (which can be selected from a number of fats including mono- and di-glycerides). The particle size of the titanium dioxide is less than 50 microns. No colorant other than titanium dioxide is disclosed.

U.S. Pat. No. 5,230,918 discloses a food modifying composition that can contain titanium dioxide, an edible soy fiber and an aqueous liquid. Carboxymethyl cellulose is present in amounts of about 0.01% to 0.05% (see column 7, lines 20 to 25).

U.S. Pat. No. 5,393,333 discloses a mixture comprising (a) a non-α-cellulose, (b) a colored pigment and (c) an edible plasticizer in an aqueous or organic solvent that can be used to coat a solid product.

While the prior art discloses processes and compositions for effecting color changes in food, some of these are not without problems. The use of diluents as described in U.S. Pat. Nos. 5,002,789 and 5,069,918 requires careful control of the particle size of the colorant, a diluent in particle form and a need to control the particle size of the diluent and the dilution ratio.

None of the above referred to prior art, alone or in combination, teach or suggest the specific mixture of glycerides, titanium dioxide as a coating for an edible colorant as is defined in applicant's invention

SUMMARY OF THE INVENTION

The present invention provides a food composition having the ability to change color when heated to a temperature of above 160° F., comprising (1) an edible substrate and (2) a color system of colored edible particles coated by a composition consisting essentially of (a) a distilled glyceride selected from the group consisting of distilled monoglycerides, distilled diglycerides and mixtures thereof, (b) titanium dioxide and (c) optionally carbomethoxy cellulose.

A preferred food composition in accordance to the one defined above is one comprising (1) an edible substrate and (2) a color system of colored edible particles coated by a composition consisting essentially of (a) a distilled glyceride selected from the group consisting of distilled monoglycerides, distilled diglycerides and mixtures thereof, (b) titanium dioxide and (c) carbomethoxy cellulose.

Also provided is a method for effecting color change in a food composition comprising, applying a color system of colored edible particles that have been coated by a composition consisting essentially of (a) a distilled glyceride selected from the group consisting of distilled monoglycerides, distilled diglycerides and mixtures thereof, (b) titanium dioxide and (c) optionally carbomethoxy cellulose to an edible substrate to prepare a composition having a white color and (2) heating said white colored substrate to a temperature above 160° F. In a preferred embodiment the coating contains carbomethoxy cellulose.

Also provided is an edible color system of colored edible particles coated by a composition consisting essentially of (a) distilled monoglycerides, distilled diglycerides and mixtures thereof and (b) titanium dioxide and (c) optionally carbomethoxy cellulose. In a preferred embodiment the color system contains carbomethoxy cellulose.

Finally provided is a process for preparing a food color system having the ability to change color when heated to a temperature of above 160° F., comprising (a) coating edible colored particles with a composition consisting essential of (a) distilled monoglycerides, distilled diglycerides and mixtures thereof, (b) titanium dioxide and (c) optionally carbomethoxy cellulose. In a preferred embodiment the color composition also contains carbomethoxy cellulose.

The color system and compositions of the current invention require neither amines and other Maillard reactants nor does it require the added expense and time of preparing small particles.

Other advantages of the present invention over prior art include: dual microwave and conventional cooking application; control of color development prior to heating thus allowing preparation and distribution at standard temperatures without prematurely triggering a color change; eliminates the necessity of preparing separate diluent particles and the need to control the ratio of colorant particles and diluent particles. It can be used to provide a uniform or speckled color.

DETAILED DESCRIPTION OF THE INVENTION

The present invention is directed to an edible color system that can be evenly applied to an edible substrate that will give the substrate the appearance of changing colors upon being heated to a temperature above 160° F. The color change will occur when either conventional or microwave heat is applied.

Throughout the specifications and claims, percentages are by weight and temperatures in degrees Fahrenheit, unless otherwise indicated.

The starting materials for the ingredients utilized in the compositions of this invention are commercially available or can be made by methods well known in the art.

Colored Particles

The edible colored particles can be sprinkles prepared from mixtures of sugar, starch, water and edible dyes by methods well known in the art. Examples of such particles are Red 40, Blue 1 and spray dried Turmeric. Particle size of the particles may range from 100–6,000 microns on its longest dimension. The preferred particle size is above 1,000 microns.

Coating and Coated Particles

The coating consists essentially of a glyceride selected from the group consisting of (a) monoglycerides, diglycerides and mixtures thereof (b) titanium dioxide and (c) optionally carboxymethyl cellulose. Carbomethoxy cellulose is contained in a preferred embodiment. Preferred glycerides are monoglycerides i.e. MYVEROL(R) 18–06. The percentage by weight of each component of the coating is glyceride (80–90%), titanium dioxide (5–12%) and carbomethoxy cellulose (0–5%).

The coated particles can be prepared by methods well known in the art. Such methods include fluidized bed agglomeration.

The coating on the particles is a continuous one rather an agglomeration of discrete particles as in U.S. Pat. Nos. 5,002,789 and 5,069,918.

Color Changing Food Composition

The coated particles are added to frosting at a temperature of about 115 to 130° F. The frosting is then spread on the edible substrate while the edible substrate is at a temperature of about 160° and then a layer of uncolored frosting is spread over the first layer, producing a white appearance. When the coated substrate is heated to a temperature of above 160° F., the white coloring is replaced by the color of the edible colored particles. Alternatively, the particles can be applied onto a prefrosted substrate with no overcoating or second layer of frosting being required.

The edible substrate can be selected from a variety of foods including those made from cereal grains such as barley, corn, rice and mixtures thereof. Other usable foods are various doughs and batters used for making biscuits, cookies and other bakery products.

Preparation—Coated Colored Particle Utilizing the procedure described above, coated colored particle containing the following composition are prepared.

| Ingredient | Weight % |
|---|---|
| Annato FC,AP | 2.53 |
| Sugar | 28,15 |
| Starch | 28.15 |
| TiO2 | 4.90 |
| MYVEROL 18-06 | 34.31 |
| CMC Starah | 1.96 |

Annato FC, AP is well known in the art.

The foregoing sets forth a preferred embodiment of the present invention. However, the invention is not to be limited to the specific scope of the disclosure and examples presented herein except to the extent that such limitations are found in the claims.

The embodiments of the invention in which an exclusive property or privilege is claimed are defined as follows:

1. A food composition having the ability to change colors when heated to a temperature above 160° F., comprising (1) an edible substrate and (2) a color system of edible particles coated by a composition consisting essentially of (a) a distilled glyceride selected from the group consisting of distilled monoglycerides, distilled diglycerides and mixtures thereof, (b) titanium dioxide and optionally, (c) carbomethoxy cellulose; wherein the particle size of the edible colored particles is between about 100 microns and about 6,000 microns.

2. A food composition according to claim 1, wherein the food composition is a pastry confectionery.

3. A food composition according to claim 1, wherein the distilled glyceride is a distilled monoglyceride.

4. A food composition according to claim 1, wherein the particle size of the edible colored particles is between above 1,000 microns to about 6,000 microns.

5. A food composition according to claim 1, wherein the color system of edible particles is coated by a composition consisting essentially of (a) a distilled glyceride selected from the group consisting of distilled monoglycerides, distilled glycerides and mixture thereof and (b) titanium dioxide.

6. A food composition according to claim 5, wherein the food composition is a pastry confectionery.

7. A food composition according to claim 5, wherein the distilled glyceride is a distilled monoglyceride.

8. A food composition according to claim 5, wherein the particle size of the edible colored particle is between above 1,000 microns to about 6,000 microns.

9. A method of effecting a color change in a food composition, comprising (1) applying a color system of colored edible particles that have been coated by a composition consisting essentially of (a) a distilled glyceride selected from the group consisting of distilled monoglycerides, distilled diglycerides and mixtures thereof, (b) titanium dioxide and optionally, (c) carbomethoxy cellulose to an edible substrate to prepare a composition having a white color, and (2) heating said white colored composition to a temperature above 160° F., wherein the particle size of the edible colored particles is between about 100 microns and about 6,000 microns.

10. A method according to claim 9, wherein the food composition is a pastry confectionery.

11. A method according to claim 9, wherein the distilled glyceride is a distilled monoglyceride.

12. A method according to claim 9, wherein the colored edible particles have been coated by a composition consisting essentially of (a) distilled monoglycerides, distilled diglycerides and mixtures thereof and (b) titanium dioxide.

13. A method according to claim 12, wherein the food composition is a pastry confectionery.

14. A method according to claim 12, wherein the distilled glyceride is a distilled monoglyceride.

15. A method according to claim 12, wherein the particle size of the edible colored particles is between above 1,000 microns to about 6,000 microns.

16. A color system of colored edible particles coated by a composition consisting essentially of (a) a distilled glyceride selected from the group consisting of distilled monoglycerides, distilled diglycerides and mixtures thereof, (b) titanium dioxide and optionally, (c) carbomethoxy cellulose; wherein the particle size of the edible colored particles is between about 100 microns and about 6,000 microns.

17. A color system according to claim 16, wherein the distilled glyceride is a distilled monoglyceride.

18. A color system according to claim 16, wherein the colored edible particles are coated by a composition consisting of (a) distilled glyceride selected from the group consisting of distilled monoglycerides, distilled diglycerides and mixtures thereof and (b) titanium dioxide.

19. A color system according to claim 16, wherein the distilled glyceride is a distilled monoglyceride.

20. A pastry confectionery having the ability to change colors when heated to a temperature above 160° F., comprising (1) an edible substrate and (2) a color system of edible particles coated by a composition consisting essentially of (a) 80–90% by weight of a distilled monoglyceride, (b) 5 to 12% by weight of titanium dioxide and optionally, (c) 0–5% by weight of carbomethoxy cellulose; wherein the particle size of the edible colored particles is between above 1,000 microns to about 6,000 microns.

* * * * *